US012540260B2

(12) United States Patent
Zurutuza Elorza et al.

(10) Patent No.: US 12,540,260 B2
(45) Date of Patent: Feb. 3, 2026

(54) WATER-BASED ADHESIVE FOR THE MANUFACTURE OF LAMINATED CELLULOSIC BOARDS COMPRISING MONOLAYER GRAPHENE OXIDE, LAMINATED CELLULOSIC BOARDS OBTAINED THEREWITH, AND METHODS FOR PRODUCTION THEREOF

(71) Applicant: GRAPHENEA S.A., Donostia-San Sebastian (ES)

(72) Inventors: Amaia Zurutuza Elorza, Donostia-San Sebastian (ES); Amaya Ortega Murguialday, Donostia-San Sebastian (ES); Beatriz Alonso Rodríguez, Donostia-San Sebastian (ES)

(73) Assignee: GRAPHENEA S.A., Donostia-San Sebastian (ES)

( * ) Notice: Subject to any disclaimer, the term of this patent is extended or adjusted under 35 U.S.C. 154(b) by 891 days.

(21) Appl. No.: 17/641,354

(22) PCT Filed: Sep. 9, 2020

(86) PCT No.: PCT/EP2020/075193
§ 371 (c)(1),
(2) Date: Mar. 8, 2022

(87) PCT Pub. No.: WO2021/048203
PCT Pub. Date: Mar. 18, 2021

(65) Prior Publication Data
US 2022/0340790 A1 Oct. 27, 2022

(30) Foreign Application Priority Data
Sep. 9, 2019 (EP) ..................... 19382779

(51) Int. Cl.
| C09J 103/02 | (2006.01) |
| B32B 7/10 | (2006.01) |
| B32B 7/12 | (2006.01) |
| B32B 9/06 | (2006.01) |
| B32B 29/00 | (2006.01) |
| B32B 29/08 | (2006.01) |
| B32B 37/12 | (2006.01) |
| C08K 3/04 | (2006.01) |
| C09J 5/00 | (2006.01) |
| C09J 11/04 | (2006.01) |
| C09J 103/04 | (2006.01) |
| D21J 1/00 | (2006.01) |

(52) U.S. Cl.
CPC .............. *C09J 103/02* (2013.01); *B32B 7/10* (2013.01); *B32B 7/12* (2013.01); *B32B 9/06* (2013.01); *B32B 29/005* (2013.01); *B32B 29/08* (2013.01); *B32B 37/12* (2013.01); *C08K 3/042* (2017.05); *C09J 5/00* (2013.01); *C09J 11/04* (2013.01); *C09J 103/04* (2013.01); *D21J 1/00* (2013.01); *B32B 2250/26* (2013.01); *B32B 2264/108* (2013.01); *B32B 2317/12* (2013.01); *B32B 2317/127* (2013.01); *C08K 2201/011* (2013.01); *C09J 2403/00* (2013.01)

(58) Field of Classification Search
CPC ......... C08K 3/04; C09J 103/02; C09J 103/04; C09J 11/04
USPC ............................................... 524/47
See application file for complete search history.

(56) References Cited

U.S. PATENT DOCUMENTS

| 2017/0073553 A1* | 3/2017 | Chang ................ B05D 3/007 |
| 2017/0121572 A1* | 5/2017 | Messenger ............ C09J 103/02 |

FOREIGN PATENT DOCUMENTS

| CN | 106381104 A | 2/2017 | |
| CN | 108914675 A | 11/2018 | |
| EP | 2886621 A1 * | 6/2015 | ............ B32B 23/04 |
| EP | 3070053 A1 | 9/2016 | |

OTHER PUBLICATIONS

Machine translation of CN 106381104 A (Year: 2017).*
International Search Report issued Feb. 9, 2021 re: Application No. PCT/EP2020/075193, pp. 1-3, citing: CN 106 381 104 A, CN 108 914 675 A and EP 2 886 621 A1.
Written Opinion issued Feb. 9, 2021 re: Application No. PCT/EP2020/075193, pp. 1-5, citing: CN 106 381 104 A, CN 108 914 675 A and EP 2 886 621 A1.

* cited by examiner

Primary Examiner — Deve V Hall
(74) Attorney, Agent, or Firm — CANTOR COLBURN LLP

(57) ABSTRACT

A water-based adhesive for the manufacture of laminated cellulosic boards includes monolayer graphene oxide as a glue enhancer. Laminated cellulosic boards may be obtained by providing cellulosic plies, applying a water-based adhesive, and contacting the surface of another cellulosic ply to the first cellulosic ply. A method for producing the water-based adhesive includes mixing starch, water and glue enhancer. The glue enhancer is a suspension of between 0.1 wt % and 0.001 wt % of monolayer graphene oxide in water.

15 Claims, 4 Drawing Sheets

WATER-BASED ADHESIVE FOR THE MANUFACTURE OF LAMINATED CELLULOSIC BOARDS COMPRISING MONOLAYER GRAPHENE OXIDE, LAMINATED CELLULOSIC BOARDS OBTAINED THEREWITH, AND METHODS FOR PRODUCTION THEREOF

TECHNICAL FIELD

The present disclosure relates to the field of water-based adhesives, and particularly to a glue enhancer based on monolayer graphene oxide for such adhesives. The aqueous adhesives of the disclosure are suitable for the production of laminated cellulosic boards, such as cardboard or paper laminates (e.g. cardboard blanks).

BACKGROUND

Adhesives are substances that are widely used in many industries for the production of objects and/or materials. In many cases, adhesives are essential for correctly producing the objects and/or materials.

Examples of industries which require adhesives are the paper making industry and the manufacture of laminated cellulosic boards. Although both industries are related to paper, they are intrinsically different, having different needs with regard to the adhesives used, as in the first, cellulose fibers are attached one to another, whereas in the second one, sheets of paper or cardboard are attached one to another. In the paper making industry, cellulosic materials are used as raw material (such as wood fibers, but rags, flax, cotton linters, bagasse . . . ), to produce pulp, paper, paperboard and other cellulose-based products, wherein the adhesives are used to bond the cellulosic fibers. In the manufacture of laminated cellulosic boards, e.g. cardboard, wherein cardboard plies are usually attached one to another, to provide multilayers, by means of such adhesives. However, not only the plies must be attached one to another, so as to provide a cardboard blank, but they also have to be attached in such a manner that the resulting cardboard blanks resist manipulation by users, meteorological phenomena such as humidity, rain, cold and hot temperatures, etc. Namely, the cardboard blanks need to be reliable, and adhesives are highly relevant from this standpoint.

Graphene has been used in many different objects and materials because, in many cases, graphene makes it possible to enhance the functionality or properties of said objects or materials. There have been a few attempts disclosed in the prior art to incorporate graphene oxide to paper pulp, to try to improve some of the paper properties, as well as to incorporate graphene to cardboard, so as to improve the adhesion properties of the adhesive used in its manufacture.

For example, patent application CN106381104A discloses water-based adhesive products, which can be used for bonding various powders, fiber, soils and the like, that is, may be used for example in the papermaking industry. The problem which is intended to be solved is to provide recyclable and environmentally friendly adhesives, while maintaining good performance. As may be seen in the examples section, the adhesive material is mainly a synthetic adhesive, such as acrylamide, methyl acrylate, potassium acrylate, N,N'-bis(acryloyl)cystamine and N,N-methylenebisacrylamide, which may be supplemented with a polysaccharide material, among which water-soluble starch is mentioned. The water-based adhesives further contain a graphite material, which may be selected from single-layer graphite oxide, multilayer graphene oxide or flaky graphite. No particular properties are assigned to the graphite material, and the exemplified adhesives are only used to bond powdery soil, no paper nor cellulosic fibers are disclosed in the examples, and even the less the bonding of cellulosic boards.

Patent application CN108914675 discloses a method for manufacturing weather-resistant, waterproof, and high quality printing special paper, which includes preparing pulp, manufacturing paper therewith, and applying an adhesive layer thereto. In the step of preparing pulp, a solubilizer composition is added, which comprises all of: graphene quantum dots, nano-silica and nano-titanium dioxide. The graphene quantum dots are single-layer graphene oxide quantum dots prepared by a microwave stripping method. It is disclosed that the single-layer graphene oxide quantum dots provide a good surface modification function, whereas silica can effectively improve the adhesion of papermaking fibers and improve the folding resistance and mechanical properties of paper.

Patent document EP-2886621-A1 in turn discloses an adhesive for the manufacture of laminates of cellulose products, that is, an adhesive for the manufacture of laminated cellulosic boards. Graphene nanofilaments are added to a mixture of water and starch, so as to produce the adhesive. The nanofilaments added have a diameter ranging from 1 to 100 nanometers and a length greater than 30 micrometers. Such nanofilaments, however, do not mix up well with water or aqueous solutions. Accordingly, the mixture is not really stable, and must be used within a short period of time after preparation, and the adhesive properties of the adhesive to which they are added are not considerably improved, probably due to the reduced mixing with water.

Therefore, there remains an interest in providing an adhesive that may overcome the shortcomings of prior art solutions, useful for manufacturing laminated cellulosic boards.

SUMMARY

According to a first aspect, the present disclosure refers to a water-based adhesive for the manufacture of laminated cellulosic boards, comprising:
1) water;
2) between 20.0 wt % and 40.0 wt % starch;
3) optionally, up to 10 wt % of at least one further polymer, selected from natural polymers or soluble synthetic polymers;
4) a glue enhancer, comprising monolayer graphene oxide in water, in an amount such that the water-based adhesive comprises between 0.1 wt % and $10^{-7}$ wt % of monolayer graphene oxide;
5) at least one component selected from fungicides and biocides, and/or stabilizing agents, gelling agents, thickening agents, anti-foaming agents, tackifiers, damp-proofing resins and rheology agents, in accordance with the polymer(s).

According to particular embodiments, the starch may be contained in the water-based adhesive in an amount of 20 to 32 wt. %, for example in an amount between 25 and 30 wt. %.

The starch may for example be one out of maize starch, wheat starch, potato starch, pea starch, tapioca starch, or mixtures thereof.

The starch may be chemically modified, to allow the starch to function properly under conditions frequently encountered during processing or storage, such as high heat, high shear, low pH, freeze/thaw and cooling.

The at least one component 5) above may for example be borax powder and a mixture of calcium hydroxide and sodium carbonate, which upon dissolution in water provides caustic soda (sodium hydroxide). Sodium hydroxide facilitates the penetration of the glue into the paper and reduces time to gel. Borax powder stabilizes the glue, by reacting with the cooked starch, and improves glue adherence and its penetration into the paper. It further helps to give optimal rheology. The concentration of sodium hydroxide in the adhesive may be between 1.5 and 3.0 wt. %, and the concentration of borax in the adhesive may be between 1 and 2 wt. %.

Other additional components 5) may be for example at least one of urea-formaldehyde, which improves the moisture resistance, polyvinyl alcohol or polyvinyl acetate, which improves the resistance to cold water, or biocides, which inhibit fungal growth.

In the water-based adhesive as defined above, the natural polymer is selected from vegetable sources, protein sources or animal sources, particularly it is selected from dextrins, starches or albumins, or from any polymers extracted from casein, blood, fish, soybean, hides or bones. The soluble synthetic polymer is selected from polyvinyl alcohol, cellulose ethers, methylcellulose, carboxymethylcellulose, polyvinylpyrrolidone, urea-formaldehyde blends and melamine-formaldehyde blends.

The water-based adhesive may comprise only one further polymer, or a mixture of one or more polymers.

The remainder up to 100 wt. % will be water.

The monolayer graphene oxide was synthesized according to the method disclosed in EP15382123, which is herewith incorporated by reference with regard to the preparation method of graphene oxide. In general terms, the procedure is based in a modified Hummers method in which the oxidation reaction and the post exfoliation process is carried out with a high shear mixer. In this way, the graphene oxide is exfoliated at the same time the reaction is taking place, so the yield, the oxygen content and the monolayer content is higher than using the standard stirring methods. The monolayer graphene oxide obtained by the referred method is in the form of nanoplates, as defined in ISO/TR 18401:2017. Therefore, the monolayer graphene oxide used to prepare the adhesive of the present disclosure is in the form of such nanoplates. The referred ISO norm provides a definition and classification of nano-objects, based on their size and shape. Nano-objects are typically described or grouped in terms of the dimensions constrained in the nanoscale. As such, if one dimension is in the nanoscale, but the other two dimensions are larger than the nanoscale, the objects are known as nanoplates. If two dimensions are in the nanoscales, the objects are known as nanofibers, including nanotubes. If all three dimensions are in the nanoscales, the objects are known as nanoparticles or quantum dots.

The damp-proofing resins may be, for example, ketone-formaldehyde, urea-formaldehyde or resorcinol.

In the water-based adhesives according to the present disclosure, the monolayer graphene oxide is used as an adhesive enhancer. Therefore, a further aspect of the disclosure is the use of monolayer graphene oxide as an adhesive enhancer for water-based adhesives for the manufacture of laminated cellulosic boards. Such monolayer graphene oxide is in the form of nanoplates as defined in ISO/TR 18401:2017.

Preferred components 5) are caustic soda and/or borax. Preferred amounts of caustic soda are between 1.5 and 3 wt. % with respect to the weight of starch, and of borax between 1 and 2 wt. % with respect to the weight of starch.

A third aspect of the disclosure is a method for producing the water-based adhesive for the manufacture of laminated cellulosic boards of the disclosure as defined above, comprising mixing starch, water and glue enhancer, said glue enhancer being a suspension of between 0.1 wt % and 0.001 wt % of monolayer graphene oxide in water. Such monolayer graphene oxide in water preferably being in the form of nanoplates as defined in ISO/TR 18401:2017

For example, said method comprises the steps of:
a) mixing starch into a first aqueous solution under stirring and at a temperature between 20.0° C. and 30.0° C., to obtain a first mixture comprising between 20.0 wt % to 40.0 wt % of starch; and
b) adding to said first mixture a glue enhancer under stirring, said glue enhancer being a second water base, comprising between 0.1 wt % and 0.001 wt % of monolayer graphene oxide, thereby producing a second mixture comprising between 0.1 wt %-$10^{-7}$ wt % of monolayer graphene oxide.

The second mixture may be directly used as a water-based adhesive.

The concentration of monolayer graphene oxide in said second mixture may be preferably between 0.001 wt % and $10^{-7}$ wt %, even more preferably between $10^{-5}$ wt % and $10^{-7}$ wt %, in order to reduce the costs of monolayer graphene oxide in the mixture. As indicated above, said monolayer graphene oxide is preferably in the form of nanoplates as defined in ISO/TR 18401:2017

According to further embodiments, the temperature in step a) is between 24.0° C. and 26.0°, preferably between 24.5° C. and 25.5° C.

Further embodiments provide stirring of the first mixture in step a) for at least 20 minutes, and/or stirring of the second mixture in step b) the second mixture for at least 10 minutes.

The adhesive may be prepared by different methods which are known in the state of the art.

For example, it may be prepared by a method known as "Steinhall", which provides a 2 phase adhesive consisting of a starch solution made with a primary starch, called carrier, in which uncooked raw starch, i.e. a secondary starch, is suspended. The carrier is prepared by the combined action of heat and caustic soda on a starch slurry. This provides the required viscosity, holding the water necessary for the gelatinization of the secondary starch and controls the absorption into the papers as well as the initial tack strength.

A further preparation method which may be used is the "No carrier" process. This process provides a single phase adhesive. Most of the starch granules are partially swollen, so that the mixture is viscous enough to prevent sedimentation. The starch slurry swells progressively when subjected to precise heat and alkali conditions and swelling reaction is stopped at the required viscosity using boric acid.

Minocar is a further process which may be used. The Minocar process is a development of the no-carrier process, and provides a two phase adhesive, consisting of a primary portion where most of the granules are partially swollen, in which uncooked raw starch is suspended.

A further adhesive to which the glue enhancer according to the present disclosure may be added is the "One-Bag Mix" (OBM) starch, which is a blend of several components which, when mixed with water, form a Stein-Hall glue. The main components are:
pre-gelled (cooked and dried) starch which dissolves in the water to form the primary, carrier, component of the glue;

uncooked native starch, which is the secondary starch portion of the glue;

a mixture of calcium hydroxide and sodium carbonate, forming sodium hydroxide (caustic soda) when dissolved in water;

borax powder.

The principal reason for using OBM is its ease of use, especially in situations where preparation facilities are limited.

A further process is the Stein Hall process, which gives a two-phase adhesive consisting of a starch solution made with the primary starch (approximately 10-20 wt % of the total amount of starch), which is called a carrier, into which uncooked raw starch, secondary starch (approximately 80-90 wt. % of the total amount of starch), is suspended. The carrier is prepared by the combined action of heat and caustic soda (about 1.4-3 wt. %) on a starch slurry. About 1-2 wt. % of borax are generally added.

The adhesive of the disclosure as defined or obtained above, may be used, for example, in the manufacture of laminated cellulosic boards.

The added monolayer graphene oxide surprisingly and unexpectedly enhances the adhesive properties resulting from the polymer, e.g. starch, and thus it enhances the adhesive properties of the adhesive produced. Moreover, it seems that the presence of oxygen groups in graphene oxide makes it possible to disperse it within the adhesive, so as to improve the adhesive properties thereof.

The resulting adhesive has a reduced drying time compared with the drying time of an adhesive without graphene oxide. This, in turn, results in an increased productivity, as the production of objects with such adhesive takes less time.

Also, the mechanical properties of a product to which the adhesive is applied, for example a single wall cardboard, a simple wall cardboard, a double wall cardboard, etc., are also improved due to the adhesive. Some mechanical properties have been determined by FEFCO TESTING method n° 9 (https://find-k.ru/images/FEFCO%209.pdf, method that determines the water resistance of the glue bond of corrugated laminated cellulose boards by immersion. Also dry peeling was tested, i.e., the resistance to detach the cellulose layers by means of a dynamometer. Details are provided in the Examples and Figures.

Aside from standard laminated cellulosic boards, other products may also be produced with an adhesive according to the present disclosure, for instance, semi-chemical paper and plastic paper The major component for the production of corrugated board is paper. According to the type of application and their properties, papers used for corrugated board production may be divided into two groups:

Papers for flat layers—liners.

Papers for corrugated layers—flutings.

Liners—depending on their manufacturing process and the component composition—belong to one of the two main groups:

kraftliners, testliners.

Kraftliners—have the best strength parameter among all the liners. They are composed of the cellulose pulp with a slight addition of the recycled fibre. Usually the overcoat is better glued and has a higher smoothness.

Topliner (white kraftliner) is a grade of kraftliner. Its overcoat in most cases is made of bleached kraft pulp, while the bottom layer—of the non-bleached stock. For the more advanced imprints white coated kraftliners are used—the overcoat is mostly coated with a pigment coating colour.

Test liners—are the two-layer papers, most frequently made of 100% recovered paper. A testliner is a combination of two layers. such construction enables the use of kraft pulp for the overcoat, and the recycled fibre for the bottom layer. Due to the price relation between the expensive cellulose mass and the cheaper paper stock, we observe the contiguous growth of the latter in the testliner recipes. More and more they are entirely made of the recycled fibre. In such cases the overcoat (top layer) is dyed in order to limitate the colour of the kraft pulp. Similarly to kraftliners, testliners are manufactured with the white overcoat of similar whiteness. For the more advanced imprints the coated testliners are produced, where the overcoat is most frequently coated with the pigment coating colour.

In addition to the above described regular papers, special papers with specific properties are also applied. These include among others:

wet-strength papers—converted to ensure maintaining strength properties after wetting (PN-P-50000:1992), fat-tight papers—high resistance to fat and grease penetration. Some of these papers are particularly resistant to the penetration of the above mentioned substances (PN-P-50000:1992), barrier coated papers—with a protective layer, e.g. of polyethylene (PE), covering one or both paper sides (PN-EN 26590-1:1993), fireproof papers—flame and/or ignition resistant (PN-P-500000:1992).

Paper for flutings (corrugated plies) in corrugated boards are divided into two groups:

waste based fluting (WBF)

semi chemical flutings (SC).

WBF—is manufactured exclusively of the recycled fibre. In order to improve its mechanical properties of such fluting, starch is added to its structure. This process is popularly described as bonding. It may be carried out "in the stock" (i.e. sizing—starch is introduced into the waste paper pulp) or starch may be additionally applied on the paper surface (surface sizing).

The semi-chemical fluting contains ca. 70% of the semi-chemical pulp, manufactured from hardwood (mostly birch) in the pulping process. The remaining part of this pulp consists mostly of the recovered paper.

The adhesive according to the present disclosure may be also applied to any of the papers mentioned above.

A further aspect of the disclosure is a method for producing a laminated cellulosic board, comprising the steps of:

i) providing at least two cellulosic plies;

ii) applying, to at least a part of the surface of a cellulosic ply, an adhesive of the disclosure, comprising monolayer graphene oxide;

iii) contacting the surface of a further cellulosic ply to first cellulosic ply of step ii);

iv) optionally repeating once or more times steps ii) and iii), to obtain a laminated cellulosic board.

In the method above, step iii) may further comprise applying, to at least a part of the surface of the further cellulosic ply, an adhesive according to any one of claim 1 to 4. That is, at least a part of both surfaces to be bond one to another have applied adhesive. Methods of applying adhesives to cellulosic plies are known in the art; a preferred method is roll coating.

The cellulosic plies may be, according to an embodiment, paper or cardboard ply.

The disclosure also refers to a laminated cellulosic board obtained by the above method.

The disclosure further refers to a laminated cellulosic board, comprising at least two cellulosic plies attached one to another, characterized in that the at least two cellulosic plies are attached one to another with an adhesive according to the disclosure, that is, comprising monolayer graphene oxide.

In the above laminated cellulosic boards, at least one of the cellulosic plies may be a corrugated ply, thus providing a corrugated laminated cellulosic board.

In the above laminated cellulosic boards, at least one of the cellulosic plies may be a laminated paper.

BRIEF DESCRIPTION OF THE DRAWINGS

To complete the description and in order to provide for a better understanding of the disclosure, a set of drawings is provided. Said drawings form an integral part of the description and illustrate an embodiment of the disclosure, which should not be interpreted as restricting the scope of the disclosure, but just as an example of how the disclosure can be carried out. The drawings comprise the following figures:

FIGS. 3 and 4 show results of dry peeling tests performed with different Samples:

DETAILED DESCRIPTION OF THE DRAWINGS

Figure 1:
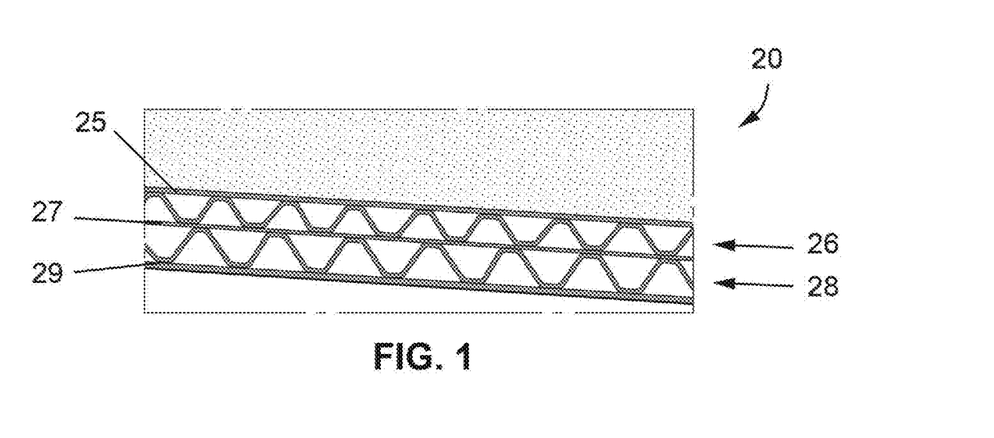
FIG. 1 shows a corrugated laminated cellulose board comprising 5 layers.

FIG. 1 shows a corrugated laminated cellulose board with a plurality of plies, particularly five, numbered 25-29, attached one to another with an adhesive, for instance an adhesive according to the present disclosure, i.e., comprising monolayer graphene oxide as glue enhancer.

The corrugated laminated cellulose board comprises a first planar ply 25, a first corrugated ply 26, which is attached underneath the first planar ply 25; a second planar ply 27, which is attached underneath the first corrugated ply 26; a second corrugated ply 28, which is attached underneath the second planar ply 27; and a third planar ply 29, which is attached underneath the second corrugated ply 28. In this particular example, the first corrugated ply 26 has a smaller fluting than the fluting of the second corrugated ply 28. This should in no case be considered a limitation of the disclosure, as the flutings of different corrugated plies may be the same or different.

One of the two major surfaces of the first and third planar plies 25 and 29 (i.e., the external liners) are attached with an adhesive to a major surface of the first and second corrugated plies 26 and 28, respectively. Each of the second planar ply 27, first corrugated ply 26 and second corrugated ply 28 have the two major surfaces thereof attached with an adhesive to a major surface of another ply. Depending on the properties of the adhesive, the plies are glued together with more or less adherence. The adhesive and the adherence influence the mechanical properties of the corrugated laminated cellulose board 20, because a resistance of a ply may be enhanced by resistance of the other plies, which depends, among other features, upon how strongly the plies are glued together.

It is readily apparent that other laminated cellulose boards, both corrugated or not, are possible within the scope of the present disclosure, for instance corrugated laminated cellulose board having a first planar ply and a first corrugated ply, or having a first planar ply, a first corrugated ply and a second planar ply, or having additional planar and/or corrugated plies, etc. Moreover, the fluting of the corrugated plies may be the same or different. It is also readily apparent that different types of paper or cardboard may be used to prepare laminated cellulose boards, such as semi-chemical paper, kraft paper, or plastic paper, for example.

Figure 2:
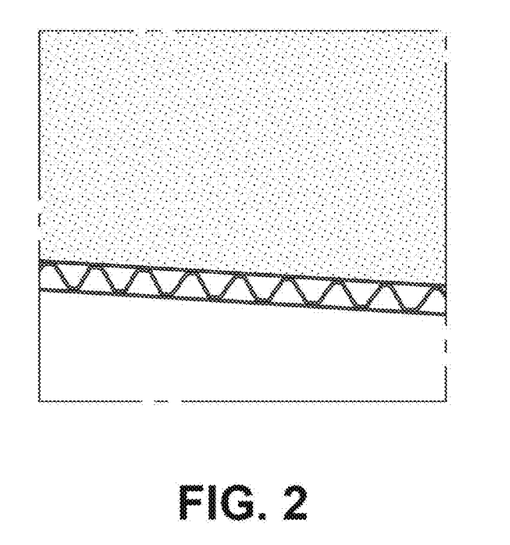
FIG. 2 shows a corrugated laminated cellulose board comprising 3 layers.

In FIG. 2 there is shown a corrugated laminated cellulosic board having three plies, particularly comprising a first planar ply, a corrugated ply, which is attached underneath the first planar ply; and a second planar ply, which is attached underneath the corrugated ply.

Figure 3:
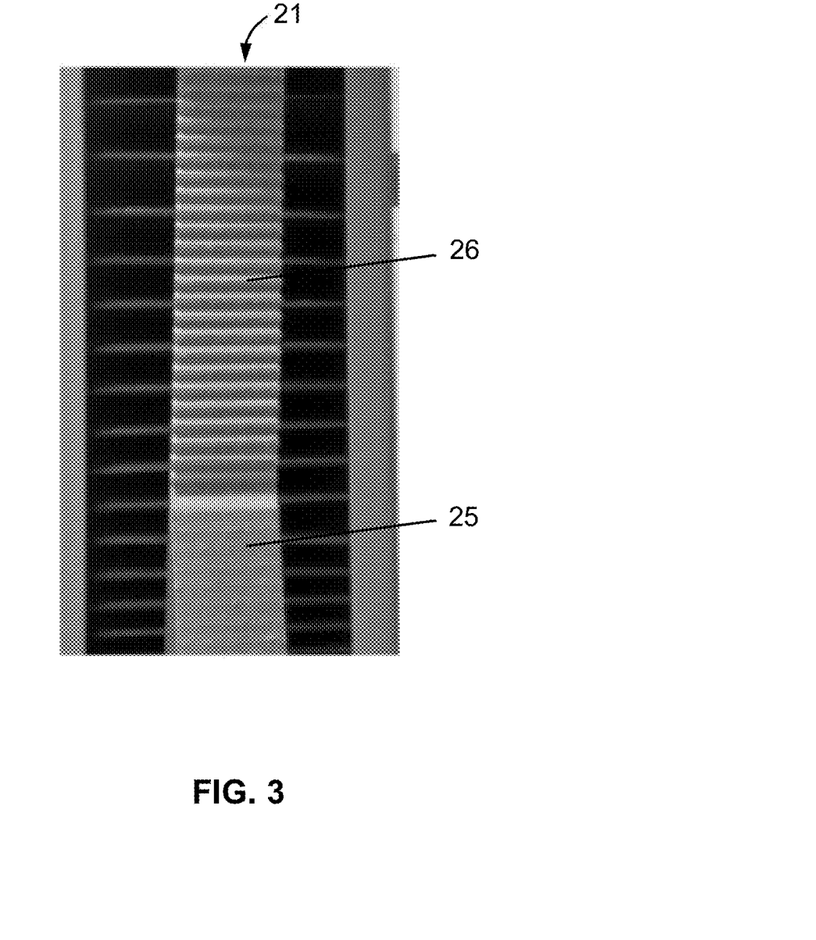
FIG. 3 corresponds to a dry peeling test performed with a corrugated board prepared using an adhesive without the glue enhancer according to the disclosure.

In FIG. 3 there is shown a corrugated laminated cellulosic board having three plies as described with reference to FIG. 2, the plies being glued with an adhesive not including a glue enhancer according to the present disclosure. As may be observed, the first planar ply separates from the corrugated ply quite easily, without the ply delaminating, due to the weak adherence of the plies one to another.

Figure 4:
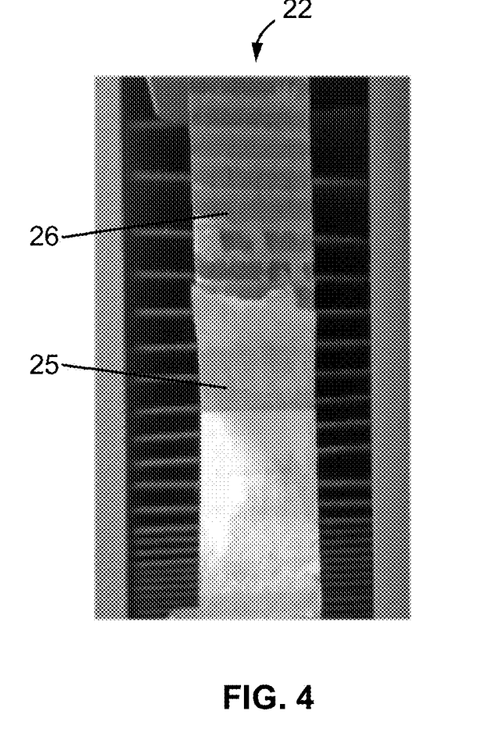
FIG. 4 corresponds to a dry peeling test performed with a corrugated board prepared using an adhesive comprising the glue enhancer according to the present disclosure.
Figure 5:
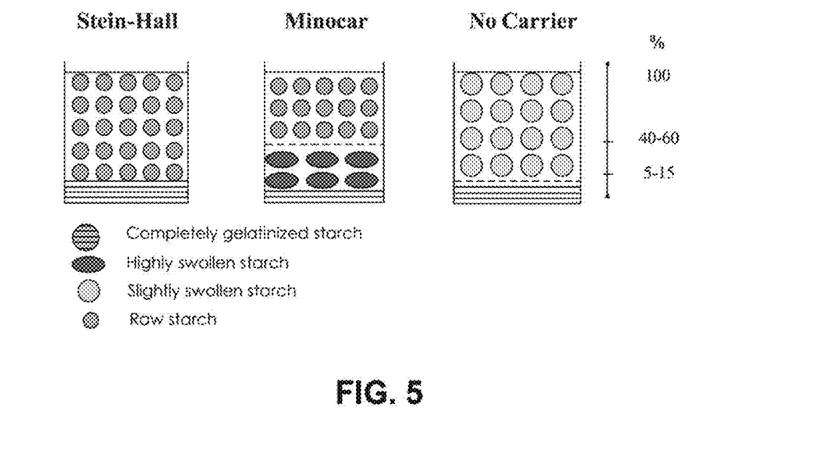
FIG. 5 shows schematic representations of the adhesives, obtained by some of the different methods of preparation described above.
Figure 6A:
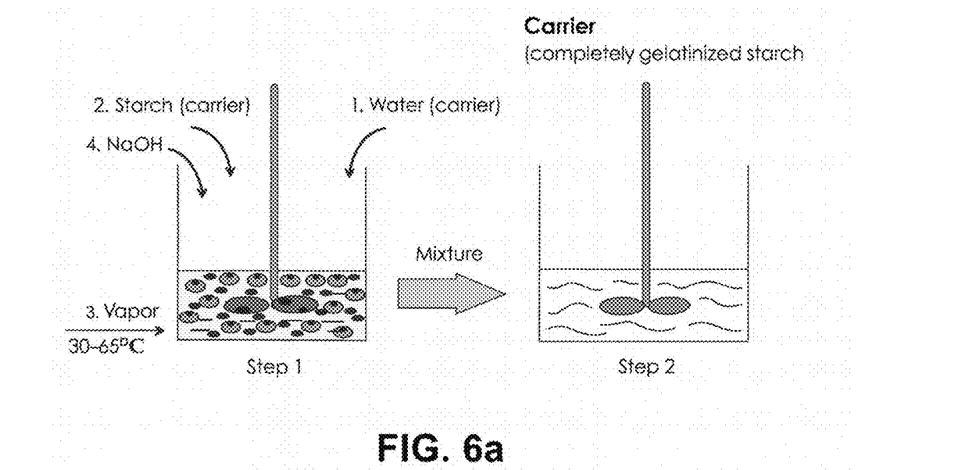
FIGS. 6*a* and 6*b* schematically show the steps of the Stein Hall process described above.
Figure 6B:
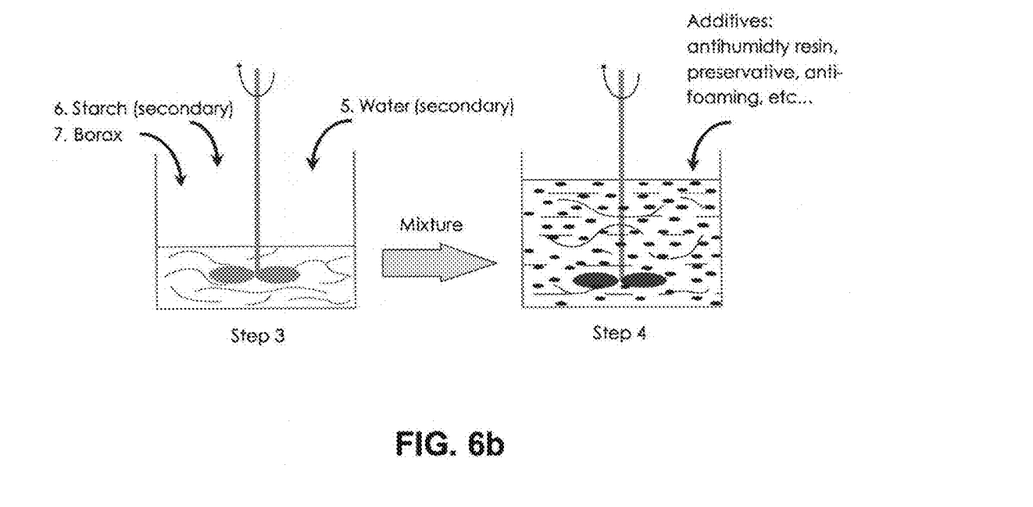

In FIG. 4 there is shown a corrugated laminated cellulosic board having three plies as described with reference to FIG. 2, the plies being glued with an adhesive including glue enhancer according to the present disclosure. As may be observed, the first planar ply in this case delaminates (i.e. both the planar and the corrugated layers break), due to a stronger adherence due to the glue enhancer according to the disclosure comprised in the adhesive used to attach the plies one to another.

EXAMPLES

In the following, the disclosure will be further illustrated by means of Examples and Comparative Examples. The Examples should in no case be interpreted as limiting the scope of the disclosure, but only as an illustration of the disclosure.

Example 1: Preparation of an Adhesive According to the Disclosure

An adhesive is produced as follows: providing a volume of water of 1800 L; heating the volume of water up to 25.0° C.; adding an amount of modified starch of 550 kg; agitating the resulting mixture for 20 minutes; adding a volume of glue enhancer of 1.5 L to the mixture, the solvent comprising water and 0.01 wt % of monolayer graphene oxide; and agitating the resulting mixture for 10 minutes. The resulting exemplary adhesive thus has, approximately, 0.0000064 wt % of monolayer graphene oxide.

Example 2: Dry Peeling Test

A dry peeling test was performed on several samples of corrugated laminated cellulose boards with and without adhesive according to the disclosure, i.e., with and without monolayer graphene oxide therein. In the dry peeling test, two plies glued one to another are peeled apart. The average load required to separate the two, over the length of the specimen is recorded, and expressed in N.

Particularly, the dry peeling test was performed on boards comprising three layers, as shown in FIG. 2. The 3 layers were the following:

superior ply: planar ply: T14; paper type: Test, grammage of 140 gr interior ply: corrugated ply, fluting SQ15; paper type: Semichemical, grammage of 150 gr inferior ply: T14; paper type: Test, grammage of 140 gr.

Sample 1 is a corrugated laminated cellulose board according to the above, prepared by using a glue or adhesive not comprising the glue enhancer according to the disclosure.

Sample 2 is a corrugated laminated cellulose board according to the above, prepared by using a glue or adhesive comprising the glue enhancer according to the disclosure.

The results of the tests are provided in Table 1, wherein two rows of values are indicated: the first row corresponding to the dry peeling between the superior, planar ply and the interior, corrugated ply; and the second row corresponding to the dry peeling between the corrugated ply and the inferior planar ply.

TABLE 1

Comparison of dry peeling tests between corrugated laminated cellulose boards with and without glue enhancer according to the present disclosure.

| | Sample 1: Adhesive without glue enhancer | Standard Deviation | Sample 2: Adhesive with glue enhancer | Standard deviation |
|---|---|---|---|---|
| Dry peeling (superior planar ply - corrugated ply) | 7.93N | 0.98 | delamination | |
| Dry peeling (corrugated ply - inferior planar ply) | 2.13N | 1.05 | 4.74N | 0.853 |

In Sample 2, i.e. having glue enhancer according to the present disclosure, the dry peeling between the superior planar ply and the corrugated ply results in delamination (refer to FIG. 4). Delamination is a consequence of the high strength of the adhesive, and both planar and corrugated layers break.

In contrast, for Sample 1, i.e. without the glue enhancer according to the present disclosure, the dry peeling between the superior planar ply and the corrugated ply the measured force was 7.93 N.

In the dry peeling test between the corrugated ply and the inferior planar ply, Sample 2 required a force of 4.74 N for the dry peeling, which is greater than the force for the dry peeling of the Sample 1 (2.13 N).

Therefore, in both cases the resistance against dry peeling of Sample 2 (comprising glue enhancer) is greater than the resistance of Sample 1 (without glue enhancer) (refer to FIG. 4 versus FIG. 3, delamination versus peeling off, without delamination).

Example 3: Determination of the Water Resistance of the Glue Bond: FEFCO Testing Method #9

Also, water resistance of the glue bond by immersion of corrugated laminated cellulose boards, manufactured with and without the adhesive comprising glue enhancer according to the present disclosure, is tested, in accordance with FEFCO Testing Method #9. The water resistance of the glue of corrugated board is expressed by the amount of time that a predetermined combination of glue lines, immersed in water, resist the pulling of a suspended weight (having a mass of 250 grams) in the plane vertical to the axis of the cellulosic board, at a right angle with respect to the glue lines.

Particularly, the dry peeling test was performed on boards comprising five layers, according to the shown in FIG. 1. The five layers, listed from up to bottom, were the following:

superior, exterior planar ply: T200; paper type: Test, grammage of 200 gr first corrugated ply: small fluting, SQ150; paper type: Semichemical, grammage of 150 gr interior ply (interior liner): T140; paper type: Test, grammage of 140 gr second corrugated ply: large fluting, SQ150; paper type: Semichemical, grammage of 150 gr inferior, exterior planar ply: T200; paper type: Test, grammage of 200 gr.

Sample 3 is a corrugated laminated cellulose board according to the above, prepared by using a glue or adhesive not comprising the glue enhancer according to the disclosure.

Sample 4 is a corrugated laminated cellulose board according to the above, prepared by using a glue or adhesive comprising the glue enhancer according to the disclosure.

It can be observed in Table 2 that Sample 4 (with the adhesive comprising glue enhancer according to the present disclosure), features a longer time before it breaks, in comparison to Sample 3 (with the adhesive not including glue enhancer). In this Table 2, the water resistance is measured between each pair of plies; also, the standard deviation of the measured times in different tests is indicated.

TABLE 2

Comparison of water resistance of the glue bond between corrugated laminated cellulose boards with and without glue enhancer according to the present disclosure.

| | Sample 3: Adhesive without Glue enhancer | Standard Deviation | Sample 4: Adhesive with Glue enhancer | Standard deviation |
|---|---|---|---|---|
| Water resistance of the glue bond (superior planar ply-first corrugated ply with large fluting) | 30 s | 2.3 | 70 s | 12.2 |
| Water resistance of the glue bond (first corrugated ply with large fluting - interior planar ply) | 29 s | 3.8 | 78 s | 20.4 |
| Water resistance of the glue bond (interior planar ply - second corrugated ply with small fluting) | break | | break | |
| Water resistance of the glue bond (second corrugated ply with small fluting - inferior planar ply) | break | | break | |

"Break" in table 1 means that the paper breaks before the adhesive unglues.

In this text, the terms first, second, etc. have been used herein to describe several substances or elements, it will be understood that the substances or elements should not be limited by these terms since the terms are only used to distinguish one substance or element from another.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claim.

The invention claimed is:

1. A water-based adhesive for the manufacture of laminated cellulosic boards, the water-based adhesive comprising:
   1) water;
   2) between 20.0 wt % and 40.0 wt % starch;
   3) optionally, up to 10 wt % of at least one further polymer, selected from natural polymers or soluble synthetic polymers;
   4) a glue enhancer, comprising monolayer graphene oxide in water, in an amount such that the water-based adhesive comprises between 0.1 wt % and $10^{-7}$ wt % of monolayer graphene oxide; and
   5) at least one further component, selected from fungicides and biocides, and/or stabilizing agents, gelling agents, thickening agents, anti-foaming agents, tackifyers, damp-proofing resins, rheology agents in accordance with the polymer(s).

2. The water-based adhesive according to claim 1, wherein the at least one further component is selected from stabilizing agents, gelling agents, tackifyers, damp-proofing resins, rheology agents, which are borax and NaOH, or a mixture of calcium hydroxide and sodium carbonate.

3. The water-based adhesive according to claim 1, wherein the starch is maize starch, wheat starch, potato starch, pea starch, tapioca starch, or mixtures thereof.

4. The water-based adhesive according to claim 1, wherein the at least one further polymer is a natural polymer selected from vegetable sources, protein sources, or animal sources.

5. The water-based adhesive according to claim 1, wherein the at least one further polymer is a soluble synthetic polymer is selected from the group consisting of polyvinyl alcohol, cellulose ethers, methylcellulose, carboxymethylcellulose, polyvinylpyrrolidone, urea-formaldehyde blends, and melamine-formaldehyde blends.

6. The water-based adhesive according to claim 1, wherein the monolayer graphene oxide is in the form of nanoplates as defined in ISO/TR 18401:2017.

7. A method for producing a water-based adhesive as defined in claim 1, comprising mixing starch, water and glue enhancer, said glue enhancer being a suspension of between 0.1 wt % and 0.001 wt % of monolayer graphene oxide in water.

8. The method of claim 7, including the following steps:
   a) mixing starch into water under stirring and at a temperature between 20.0° C. and 30.0° C., to obtain a first mixture comprising between 20.0 wt % to 40.0 wt % of starch; and
   b) adding to said first mixture a glue enhancer under stirring, said glue enhancer being a suspension of between 0.1 wt % and 0.001 wt % of monolayer graphene oxide in water, thereby producing a second mixture, comprising between 0.1 wt % and $10^{-7}$ wt % of monolayer graphene oxide.

9. The method according to claim 8, wherein in step a) the first mixture is stirred for at least 20 minutes, and in step b) the second mixture is stirred for at least 10 minutes.

10. A method for producing a laminated cellulosic board, the method including the following steps:
    i) providing at least two cellulosic plies;
    ii) applying, to at least a part of the surface of a cellulosic ply, an adhesive comprising:
       1) water;
       2) between 20.0 wt % and 40.0 wt % starch;
       3) optionally, up to 10 wt % of at least one further polymer, selected from natural polymers or soluble synthetic polymers;
       4) a glue enhancer, comprising monolayer graphene oxide in water, in an amount such that the water-based adhesive comprises between 0.1 wt % and $10^{-7}$ wt % of monolayer graphene oxide; and
       5) at least one further component, selected from fungicides and biocides, and/or stabilizing agents, gelling agents, thickening agents, anti-foaming agents, tackifyers, damp-proofing resins, rheology agents in accordance with the polymer(s);
    iii) contacting the surface of a further cellulosic ply to first cellulosic ply of step ii); and
    iv) optionally repeating once or more times steps ii) and iii), to obtain a laminated cellulosic board.

11. The method according to claim 10, wherein step iii) further comprises applying, to at least a part of the surface of the further cellulosic ply, the adhesive.

12. The method according to claim 10, wherein the cellulosic ply is a paper or cardboard ply.

13. A laminated cellulosic board comprising: at least two cellulosic plies attached one to another, wherein the at least two cellulosic plies are attached one to another with an adhesive according to claim 1.

14. The laminated cellulosic board according to claim 13 or obtained by a method including the following steps:
    i) providing at least two cellulosic plies;
    ii) applying, to at least a part of the surface of a cellulosic ply, the adhesive;
    iii) contacting the surface of a further cellulosic ply to first cellulosic ply of step ii); and
    iv) optionally repeating once or more times steps ii) and iii), to obtain a laminated cellulosic board, wherein at least one of the cellulosic plies is a corrugated ply.

15. The laminated cellulosic board according to claim 13, a method including the following steps:
    i) providing at least two cellulosic plies;
    ii) applying, to at least a part of the surface of a cellulosic ply, the adhesive;
    iii) contacting the surface of a further cellulosic ply to first cellulosic ply of step ii); and
    iv) optionally repeating once or more times steps ii) and iii), to obtain a laminated cellulosic board, wherein at least one of the cellulosic plies is a laminated paper.

* * * * *